(12) United States Patent
Li et al.

(10) Patent No.: US 12,300,828 B2
(45) Date of Patent: May 13, 2025

(54) BATTERY MODULE AND BATTERY PACK

(71) Applicant: CONTEMPORARY AMPEREX TECHNOLOGY (HONG KONG) LIMITED, Hong Kong (CN)

(72) Inventors: Ziyuan Li, Fujian (CN); Yuepan Hou, Fujian (CN); Xingdi Chen, Fujian (CN); Yu Tang, Fujian (CN); Jun Ma, Fujian (CN); Kaijie You, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 931 days.

(21) Appl. No.: 17/139,830

(22) Filed: Dec. 31, 2020

(65) Prior Publication Data

US 2021/0126310 A1 Apr. 29, 2021

Related U.S. Application Data

(63) Continuation of application No. PCT/CN2019/121031, filed on Nov. 26, 2019.

(30) Foreign Application Priority Data

Dec. 30, 2018 (CN) .......................... 201822275004.7

(51) Int. Cl.
*H01M 50/171* (2021.01)
*H01M 50/184* (2021.01)
(Continued)

(52) U.S. Cl.
CPC ....... *H01M 50/171* (2021.01); *H01M 50/184* (2021.01); *H01M 50/209* (2021.01);
(Continued)

(58) Field of Classification Search
CPC ............ H01M 50/171; H01M 50/209; H01M 50/264; H01M 50/533; H01M 50/184;
(Continued)

(56) References Cited

U.S. PATENT DOCUMENTS

| 4,020,244 A | 4/1977 | Selinko |
| 2003/0129479 A1 | 7/2003 | Munenaga et al. |

(Continued)

FOREIGN PATENT DOCUMENTS

| CN | 201893394 U | 7/2011 |
| CN | 207441810 U | 6/2018 |

(Continued)

OTHER PUBLICATIONS

EPO English Machine Translation of CN 208028109U originally published to Weng Xindi on Oct. 30, 2018 (Year: 2018).*

*Primary Examiner* — Anca Eoff
*Assistant Examiner* — Niara Trant
(74) *Attorney, Agent, or Firm* — Scully, Scott, Murphy & Presser, P.C.

(57) ABSTRACT

Some embodiments of the present application relate to a battery module and a battery pack. The battery module includes a plurality of battery cells, two insulating members and a binding strip. The insulating member includes a first face and a second face, the first face is located on a side face of the battery module, the second face is located on a bottom face of the battery module, and the two insulating members are respectively disposed on two sides of the battery module in a horizontal direction. The binding strip surrounds the plurality of battery cells and the insulating members.

14 Claims, 7 Drawing Sheets

(51) Int. Cl.
*H01M 50/198* (2021.01)
*H01M 50/209* (2021.01)
*H01M 50/264* (2021.01)
*H01M 50/533* (2021.01)
*H01M 50/588* (2021.01)
*H01M 50/593* (2021.01)

(52) U.S. Cl.
CPC ....... *H01M 50/264* (2021.01); *H01M 50/533* (2021.01); *H01M 50/588* (2021.01); *H01M 50/593* (2021.01); *H01M 50/198* (2021.01)

(58) Field of Classification Search
CPC . H01M 50/588; H01M 50/593; H01M 50/198
See application file for complete search history.

(56) References Cited

U.S. PATENT DOCUMENTS

| | | | |
|---|---|---|---|
| 2012/0052359 A1 | 3/2012 | Yoshitake et al. | |
| 2012/0114984 A1* | 5/2012 | Kim .................... | H01M 50/30 |
| | | | 429/53 |
| 2014/0057137 A1* | 2/2014 | Lee .................... | H01M 50/572 |
| | | | 429/7 |
| 2017/0125770 A1* | 5/2017 | Kim .................... | H01M 50/507 |
| 2017/0365888 A1* | 12/2017 | Kwon ................ | H01M 50/569 |
| 2020/0212388 A1 | 7/2020 | Chen et al. | |

FOREIGN PATENT DOCUMENTS

| | | |
|---|---|---|
| CN | 102088104 U | 10/2018 |
| CN | 208111582 U | 11/2018 |
| CN | 209249577 U | 8/2019 |
| EP | 2432044 A1 | 3/2012 |
| EP | 3675213 A1 | 7/2020 |

* cited by examiner

BATTERY MODULE AND BATTERY PACK

CROSS-REFERENCE TO RELATED APPLICATIONS

This application is a continuation of International Application No. PCT/CN2019/121031, filed on Nov. 26, 2019, which claims priority to Chinese Patent Application No. 201822275004.7, filed on Dec. 30, 2018. The disclosures of the aforementioned applications are hereby incorporated by reference in their entireties.

TECHNICAL FIELD

Some embodiments of the present application relate to the field of battery technology, in particular to a battery module and a battery pack.

BACKGROUND

With the continuous development of new energy technologies, battery cells (rechargeable batteries) have become more and more widely used, such as hybrid vehicles or electric vehicles. However, safety issues of devices using battery cells are gradually exposed to the public's field of vision, which also affects the development of the battery cells. When battery cells usually need to be used in groups, it is necessary to use a bus bar to connect each battery cell in series or in parallel. A plurality of battery cells are grouped to form a battery module. A plurality of battery modules are packaged by a case to form a battery pack.

SUMMARY

For this reason, an object of some embodiments of the present application is to provide a battery module and battery pack so as to solve technical problems of the prior art.

Some embodiments of the present application provide a battery module, including:

a plurality of battery cells, the plurality of battery cells being arranged in a horizontal direction;

two insulating members, the insulating member including a first face and a second face, the first face being located on a side face of the battery module, the second face being located on a bottom face of the battery module, and the two insulating members being respectively disposed on two sides of the battery module in the horizontal direction; and a binding strip, the binding strip surrounding the plurality of battery cells and the insulating members.

The insulating member plays a role of insulation protection, and can prevent the battery cells from being locally tightened by the binding strip and causing uneven stress.

In some embodiments, the battery module further includes two end plates, the two end plates are respectively disposed at two ends of the plurality of battery cells in the horizontal direction, the end plates are located above the insulating members, and the binding strip surrounds the plurality of battery cells, the two insulating members and the two end plates.

In some embodiments, the end plate is provided with a through hole for a bolt to pass through, and the through hole is disposed in a vertical direction.

In some embodiments, the end plate is provided with a binding strip restraint groove or a binding strip restraint hole. Therefore, a binding strip placement region is provided, and the binding strip is restrained by a binding strip restraint groove or a binding strip restraint hole, and is not easy to shift and fall off from the battery cell, so that the binding strip can be tied more firmly.

In some embodiments, the binding strip includes a long side and a short side, the long side extends in the horizontal direction, the short side extends in a vertical direction, and the binding strip surrounds outer peripheries of the plurality of battery cells and the two insulating members, so as to achieve fixing of a battery cell arrangement structure, which is more lightweight than that obtained in other methods.

In some embodiments, the battery cell includes an electrode assembly and a battery housing, the electrode assembly is accommodated in the battery housing, and the electrode assembly includes a first electrode sheet, a second electrode sheet, and a diaphragm disposed between the first electrode sheet and the second electrode sheet; and the electrode assembly is in a winding structure and is flat-shaped, an outer surface of the electrode assembly includes two flat surfaces, and the two flat surfaces face each other in a vertical direction; or, the electrode assembly is in a laminated structure, and the first electrode sheet, the diaphragm, and the second electrode sheet are stacked in the vertical direction.

In some embodiments, the battery cell includes a plurality of electrode assemblies, and the plurality of electrode assemblies are arranged in a vertical direction.

In some embodiments, the plurality of battery cells are also arranged in a vertical direction.

In some embodiments, the battery module further includes a plurality of battery cells arranged in a vertical direction.

Different from the prior art, the above technical solution adopts two insulating members. The insulating member includes a first face and a second face, the first face is located on a side face of the battery module, the second face is located on a bottom face of the battery module, and the two insulating members are respectively disposed on two sides of the battery module in the horizontal direction. In this way, when the battery module is placed in a case, the insulating member can prevent a surface insulating layer of the battery module from being pierced by a metal burr. In addition, the insulating member can also avoid the problem that the battery cells are locally tightened by the binding strip, causing uneven stress.

Some embodiments of the present application further provide a battery pack, including:

a case, the case including an upper case cover and a lower case, and the upper case cover being located above the lower case and disposed to be sealed with the lower case; and the battery module according to any one of the above embodiments provided by the inventor disposed in the case.

In some embodiments, a mounting beam is disposed at the bottom of the lower case, and the insulating member is disposed above the mounting beam.

Different from the prior art, the above technical solution adopts two insulating members. The insulating member includes a first face and a second face, the first face is located on a side face of the battery module, the second face is located on a bottom face of the battery module, and the two insulating members are respectively disposed on two sides of the battery module in the horizontal direction. In this way, when the battery module is placed in a case, the insulating member can prevent a surface insulating layer of the battery module from being pierced by a metal burr. In addition, the insulating member can also avoid the problem that the battery cells are locally tightened by the binding strip, causing uneven stress.

DESCRIPTION OF REFERENCE SIGNS

1. Battery module,
10. Battery cell arrangement structure,
11. Battery cell,
111. Electrode assembly,
1111. First electrode sheet,
1112. Second electrode sheet,
1113. Diaphragm,
1114. Flat surface,
112. Battery housing,
1121. First surface,
1122. Second surface,
1123. Internal space,
1120. Opening,
113. Electrode terminal connector,
114. Cover plate,
115. Electrode terminal,
12. Bus bar,
13. Insulating member,
131. First face,
132. Second face,
14. Binding strip,
141. Long side,
142. Short side,
15. End plate,
151. Through hole,
152. Restraint groove,
16. First step
2. Upper case cover,
3. Lower case,
30. Inner bottom face,
31. Mounting beam,
311. Upper surface,
4. Bolt.

DESCRIPTION OF EMBODIMENTS

In order to describe in detail the technical content, structural features, achieved objectives and effects of the technical solution, the following detailed description will be given in conjunction with specific embodiments and accompanying drawings.

In the description of embodiments of the present application, unless otherwise specified and limited explicitly, the terms "first" and "second" are merely intended for a purpose of description, and shall not be understood as an indication or implication of relative importance. Unless otherwise specified or illustrated, the term "a plurality of" refers to more than two (including two); the terms "connection" and "fixing" should be understood broadly, for example, the "connection" may either be a fixed connection, or a detachable connection, or an integrated connection, or an electrical connection; and the "connection" may either be a direct connection, or an indirect connection through an intermediary. For those of ordinary skill in the art, the specific meanings of the above-mentioned terms in the embodiments of the present application can be understood according to specific circumstances.

In the description of the embodiments of the present application, a direction indicated by an arrow x in all drawings is a length direction, a direction indicated by an arrow y is a width direction, and a direction indicated by an arrow z is a vertical direction. A horizontal direction is a direction parallel to a horizontal plane, and may either be the above length direction or the above width direction. In addition, the horizontal direction includes not only a direction absolutely parallel to the horizontal plane, but also a direction substantially parallel to the horizontal plane conventionally recognized in engineering. A vertical direction is a direction perpendicular to the horizontal plane, and the vertical direction includes not only a direction absolutely perpendicular to the horizontal plane, but also a direction substantially perpendicular to the horizontal plane conventionally recognized in engineering. In addition, orientation words such as "upper", "lower", "top" and "bottom" described in the present application are all understood with respect to the vertical direction.

When battery cells usually need to be used in groups, it is necessary to use a bus bar to connect each battery cell in series or in parallel. A plurality of battery cells are grouped to form a battery module. A plurality of battery modules are packaged by a case to form a battery pack. However, in the prior art, when a battery module is placed into a case, a surface insulating layer of the battery module is easily pierced due to the presence of a metal burr at the corner of a side wall and a bottom of the case, thereby causing safety accidents.

Figure 1:
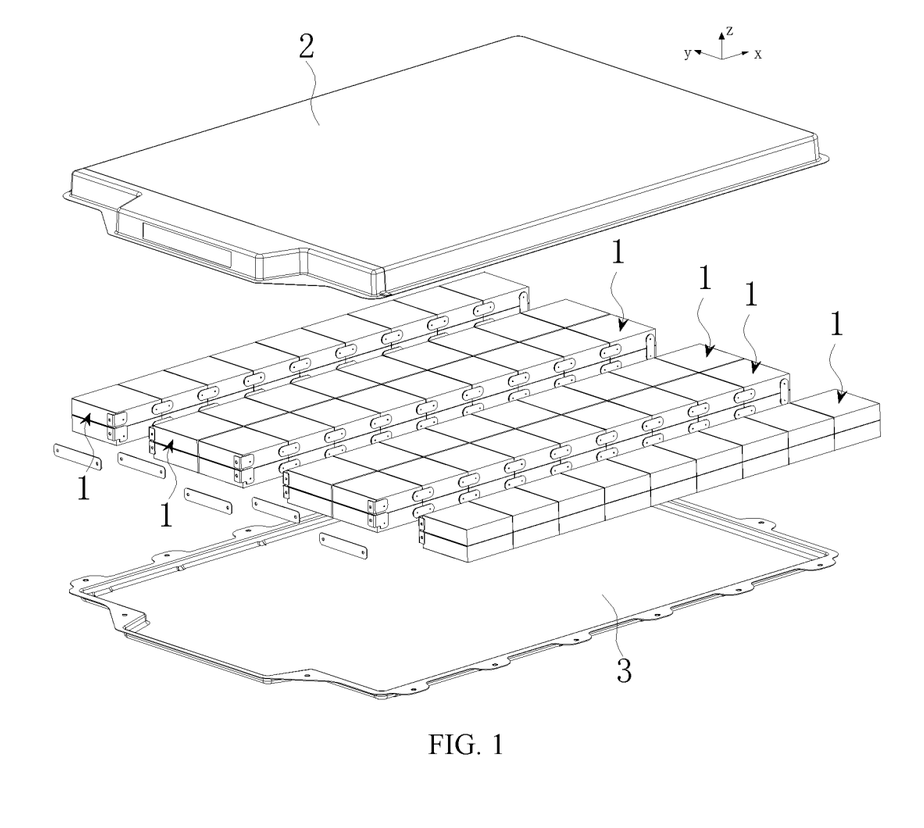
FIG. 1 is a schematic structural diagram of a battery pack.

On the basis of this, referring to FIG. 1, an embodiment relates to a battery pack including a case and a plurality of battery modules 1. The case includes an upper case cover 2 and a lower case 3, the upper case cover 2 is located above the lower case 3, and the upper case cover 2 is disposed to be sealed with the lower case 3. The sealing setting of the upper case cover 2 and the lower case 3 can prevent external moisture from entering the interior of the battery pack and causing short circuits. The battery pack can be configured to be directly mounted on a vehicle to provide a power source for the vehicle.

As shown in FIGS. 2 to 6, in some embodiments, a battery module 1 includes a battery cell arrangement structure 10, and the battery cell arrangement structure 10 includes a plurality of battery cells 11 arranged in a horizontal direction (for example, a length direction indicated by an arrow x) and a plurality of bus bars 12 electrically connecting the plurality of battery cells 11.

Moreover, in some embodiments, the battery module 1 includes at least two battery cell arrangement structures 10, and the at least two battery cell arrangement structures 10 are arranged in a vertical direction (a direction indicated by an arrow z), that is, the plurality of battery cells 11 are also arranged in the vertical direction (the direction indicated by the arrow z). In other embodiments, the number of battery cell arrangement structures 10 may also be one.

Figure 2:
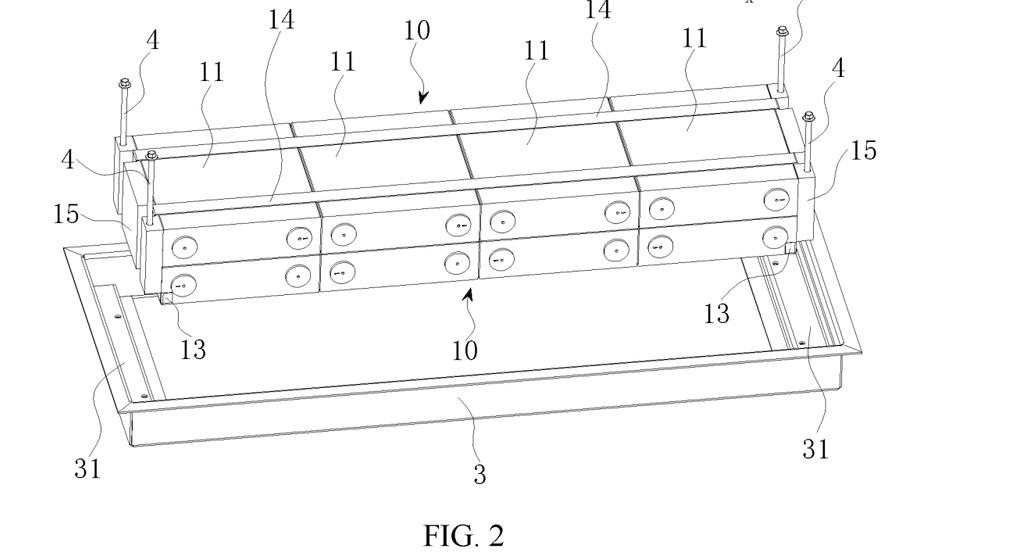
FIG. 2 is a schematic structural diagram of assembly of a battery module and a lower case.
Figure 3:
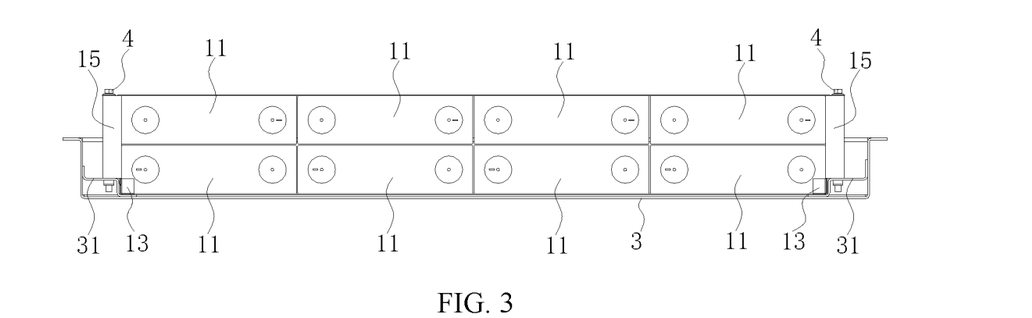
FIG. 3 is a front view of assembly of a battery module and a lower case.
Figure 4:
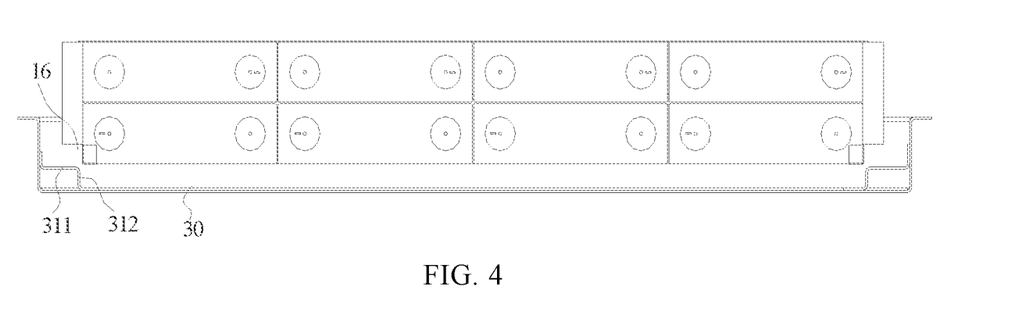
FIG. 4 is a schematic diagram of installation of a battery module and a lower case.
Figure 10:
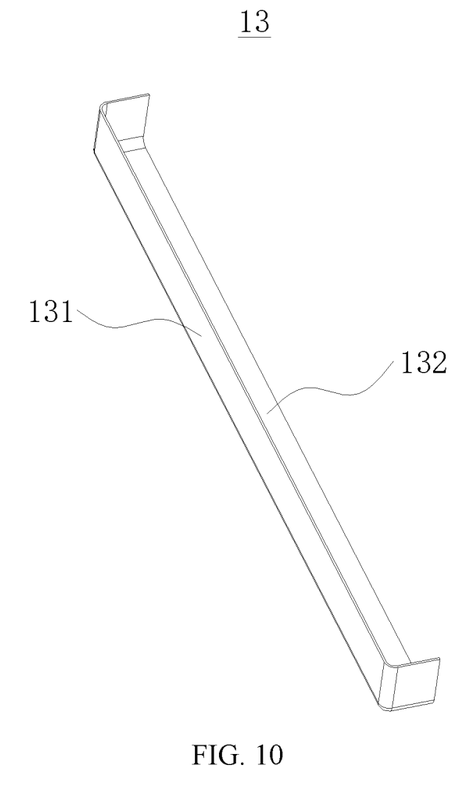
FIG. 10 is a schematic structural diagram of an insulating member.

In some embodiments, as shown in FIGS. 2, 3, and 10, the battery module 1 further includes insulating members 13. The insulating member 13 includes a first face 131 and a second face 132, the first face 131 is located on a side face of the battery cell arrangement structure 10, the second face 132 is located on a bottom face of the battery cell arrangement structure 10, and two sides of the bottom of the battery cell arrangement structure 10 are respectively provided with one insulating member 13. A binding strip 14 surrounds outer peripheries of an end plate 15, the battery cell 11 and the insulating member 13. The insulating member 13 not only plays a role of insulation protection, but also prevents the battery cell 11 from being locally tightened by the binding strip 14 and causing uneven stress.

As shown in FIGS. 2 and 3, the battery module 1 in some embodiments further includes two end plates 15, the two end plates 15 are respectively disposed at two ends of the battery cell arrangement structure 10 in a length direction (for example, the direction indicated by the arrow x), the end plates 15 are located above the insulating members 13, and the binding strip 14 surrounds outer peripheries of the battery cell arrangement structure 10 and the two end plates 15.

In addition, in some embodiments, as shown in FIGS. 2, 3, 4, and 11, the end plate 15 is provided with a through hole 151 for a bolt 4 to pass through, and the through hole 151 is disposed in the vertical direction (the direction indicated by the arrow z). The bolt 4 passes through the through hole 151 to fix the battery module 1 on a mounting beam 31 of the lower case 3. The end plate 15 makes an avoidance at a position close to the lower case 3, and a bottom face of the end plate 15 is higher than the bottom face of the battery cell arrangement structure 10, and the bottom face of the end plate 15 and the bottom face of the battery cell arrangement structure 10 form a first step 16. An upper surface 311 of the mounting beam 31 and an inner bottom face 30 of the lower case 3 form a second step, the second step is adapted to the first step 16, and the bolt 4 passes through the through hole 151 to fix the end plate 15 on the mounting beam 31. In addition, a lower surface 312 of the mounting beam 31 is prone to cut a surface insulating layer of the battery cell 11. Therefore, the insulating member 13 is disposed on the side of the mounting beam 31 for protection and at the same time can prevent the surface insulating layer of the battery module 1 from being pierced by a metal burr of the lower case 3.

Figure 5:
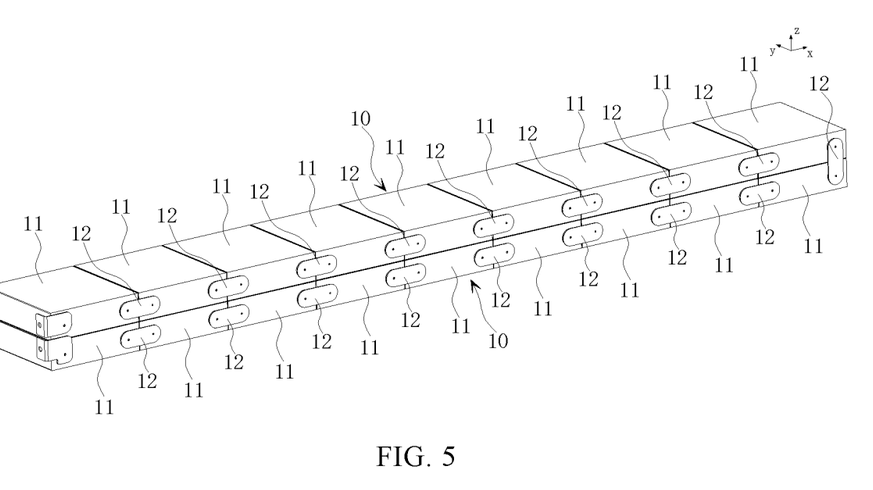
FIG. 5 is a schematic structural diagram of a battery module.
Figure 6:
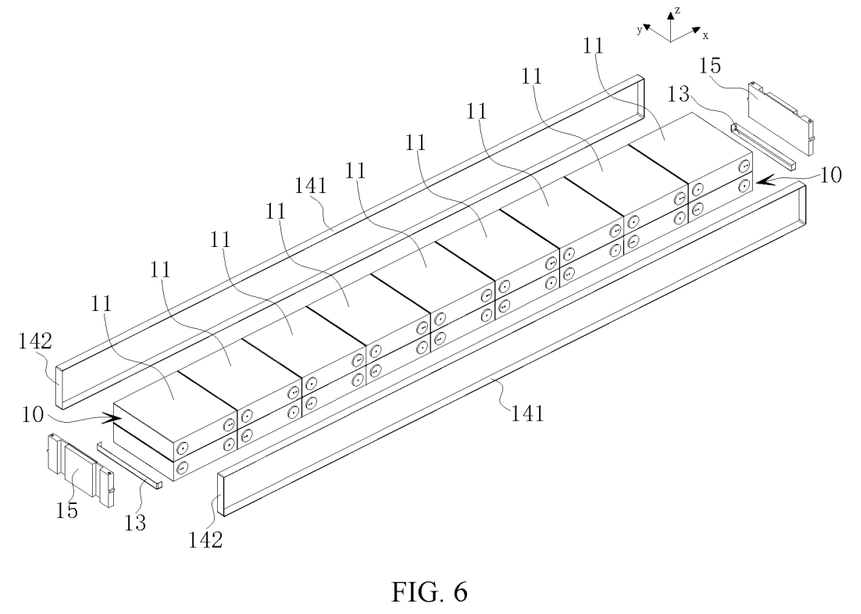
FIG. 6 is an exploded view of a battery module.
Figure 7:
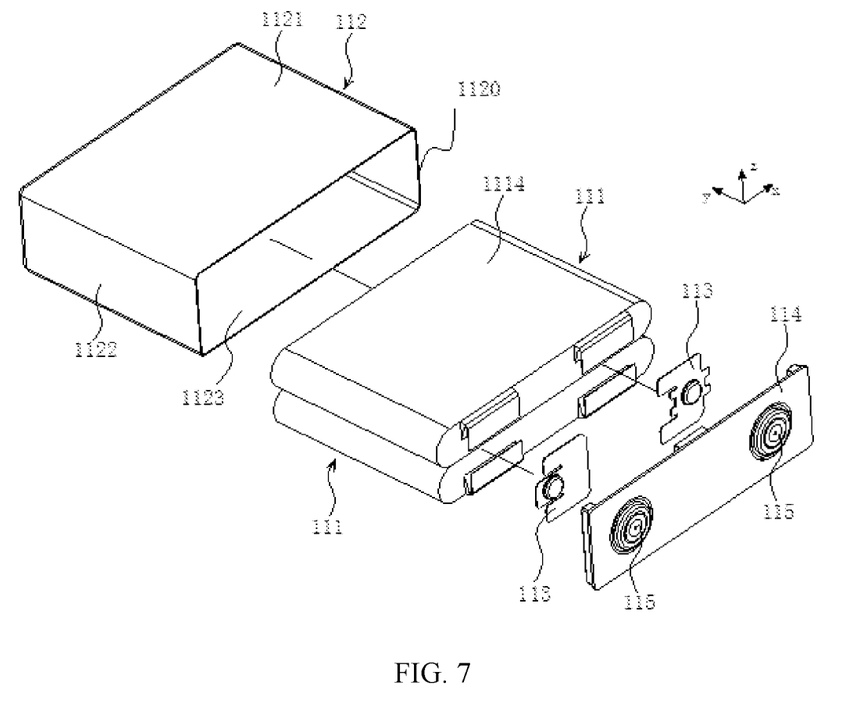
FIG. 7 is an exploded view of a battery cell.

As shown in FIGS. 5, 6, and 7, the battery module 1 further includes a binding strip 14, and the binding strip 14 surrounds the outer periphery of the battery cell arrangement structure 10. The binding strip 14 includes two long sides 141 and two short sides 142, the long side 141 faces a first surface 1121 of the battery cell 11 and extends in the horizontal direction (for example, the direction indicated by the arrow x), and the short side 142 faces a second surface 1122 of the battery cell 11 and extends in the vertical direction (the direction indicated by the arrow z). In other embodiments, the battery module 1 may be fixed by means of a press bar, a side plate or a bolt.

In some embodiments, the outer periphery of the battery cell arrangement structure 10 may be surrounded by the binding strip 14, so as to achieve fixing of the battery cell arrangement structure 10, which is more lightweight than that obtained in other methods.

The battery module 1 is provided with at least two binding strips 14, such as two or three binding strips. The two binding strips 14 are distributed at intervals in a width direction (for example, a direction indicated by an arrow y). In some embodiments, the number of the binding strips 14 may be one.

Figure 8:
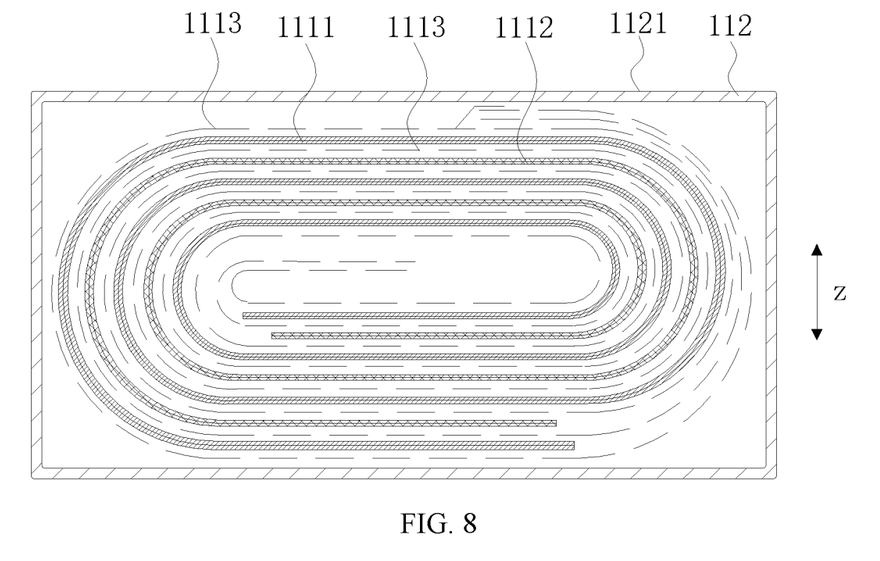
FIG. 8 is a cross-sectional view of an electrode assembly in a winding structure.
Figure 9:
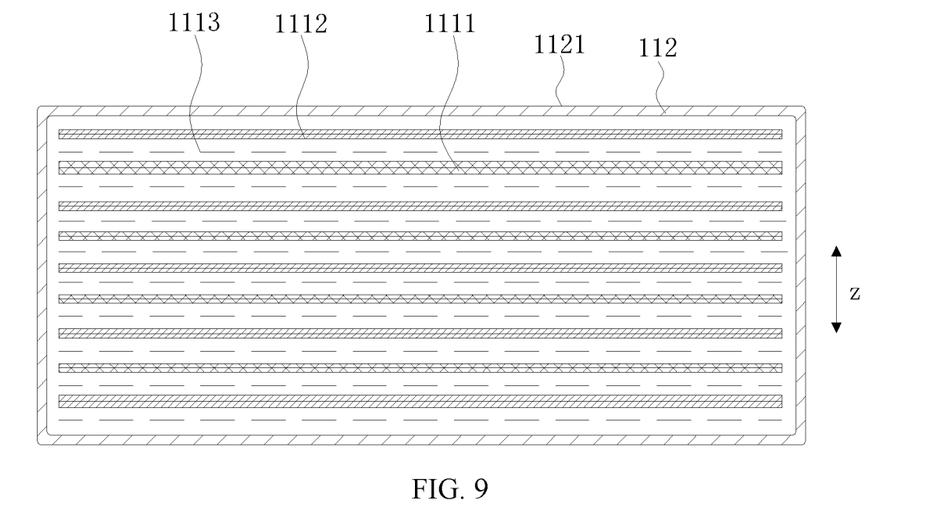
FIG. 9 is a cross-sectional view of an electrode assembly in a laminated structure.

As shown in FIGS. 7 to 9, the battery cell 11 includes an electrode assembly 111, a battery housing 112, an electrode terminal connector 113, and a cover plate 114. The battery housing 112 may have a hexahedral shape or other shapes. The battery housing 112 has an internal space 1123 accommodating the electrode assembly 111 and an electrolyte, and the battery housing 112 has an opening 1120. The electrode assembly 111 is accommodated in the battery housing 112, the cover plate 114 covers the opening 1120 and is configured to seal the electrode assembly 111 in the battery housing 112, and the electrode assembly 111 and an electrode terminal 115 are electrically connected through the electrode terminal connector 113. In this embodiment, there are two electrode terminal connectors 113, that is, a positive electrode terminal connector 113 and a negative electrode terminal connector 113, respectively. The battery housing 112 may be made of a material such as aluminum, aluminum alloy, or plastic.

As shown in FIGS. 8 and 9, the electrode assembly 111 is accommodated in the battery housing 112. One battery cell 11 includes a plurality of electrode assemblies 111, and the plurality of electrode assemblies 111 are arranged in the vertical direction (the direction indicated by the arrow z). The electrode assembly 111 includes a first electrode sheet 1111, a second electrode sheet 1112, and a diaphragm 1113 disposed between the first electrode sheet 1111 and the second electrode sheet 1112. The first electrode sheet 1111 may be a positive electrode sheet or a negative electrode sheet, and the second electrode sheet 1112 and the first electrode sheet 1111 have opposite polarities. Accordingly, the second electrode sheet 1112 is a negative electrode sheet or a positive electrode sheet. The diaphragm 1113 is an insulator between the first electrode sheet 1111 and the second electrode sheet 1112. The electrode assembly 111 may be in a winding structure (as shown in FIG. 8) or a laminated structure (as shown in FIG. 9).

Illustratively, description is made by an example that the first electrode sheet 1111 is a positive electrode sheet, and the second electrode sheet 1112 is a negative electrode sheet. Similarly, in other embodiments, the first electrode sheet 1111 may also be a negative electrode sheet, and the second electrode sheet 1112 is a positive electrode sheet. In addition, a positive electrode active material is coated on a coated region of a positive electrode sheet, and a negative electrode active material is coated on a coated region of a negative electrode sheet. An uncoated region extending from the coated region is used as an electrode tab. The electrode assembly 111 includes two electrode tabs, that is, a positive electrode tab and a negative electrode tab. The positive electrode tab extends from the coated region of the positive electrode sheet; and the negative electrode tab extends from the coated region of the negative electrode sheet. The positive electrode tab and a positive electrode terminal are electrically connected by a positive electrode connector, and the negative electrode tab and a negative electrode terminal are electrically connected by a negative electrode connector.

As shown in FIG. 7, the battery housing 112 is in a substantially hexahedral structure. The battery housing 112 includes two first surfaces 1121 and two second surfaces 1122. The area of the first surface 1121 is larger than the area of the second surface 1122. In a first battery module 1 and a second battery module 1, two second surfaces 1122 of each battery cell 11 face each other in the horizontal direction (for example, the length direction of the direction indicated by the arrow x), and two first surfaces 1121 of each battery cell 11 face each other in the vertical direction (the direction indicated by the arrow z).

As shown in FIGS. 7 and 8, when the electrode assembly 111 is in a winding structure, the electrode assembly 111 is flat-shaped, and an outer surface of the electrode assembly 111 includes two flat surfaces 1114. The two flat surfaces 1114 face each other in the vertical direction (the direction indicated by the arrow z), that is, the flat surface 1114 and the first surface 1121 face each other. The electrode assembly 111 is in a substantially hexahedral structure, and the flat surface 1114 is substantially parallel to a winding axis and is an outer surface with the largest area. The flat surface 1114 may be a relatively even surface, and is not required to be a pure plane.

As shown in FIG. 9, when the electrode assembly 111 is in a laminated structure, a first electrode sheet 1111, a diaphragm 1113, and a second electrode sheet 1112 are stacked in the vertical direction (the direction indicated by the arrow z), that is, a surface of the first electrode sheet 1111 and the first surface 1121 face each other.

The electrode assembly 111 will inevitably expand in a thickness direction of the first electrode sheet 1111 during a charging and discharging process (in the electrode assembly 111 with the winding structure, an expansion force in a direction perpendicular to the flat surface 1114 is the maximum; and in the electrode assembly 111 with the laminated structure, an expansion force in an arrangement direction of the first electrode sheet 1111 and the second electrode sheet 1112 is the maximum).

In addition, in some embodiments, the electrode assembly 111 may adopt a winding structure or a laminated structure. As shown in FIG. 8, when the electrode assembly 111 is in a winding structure, the flat surface 1114 faces toward the vertical direction (the direction indicated by the arrow z). As shown in FIG. 9, when the electrode assembly 111 is in a laminated structure, the first electrode sheet 1111 and the second electrode sheet 1112 are stacked in the vertical direction (the direction indicated by the arrow z). It can be seen that no matter whether the electrode assembly 111 adopts a winding structure or a laminated structure, a direction in which the electrode assembly 111 exerts the maximum expansion force on the battery housing 112 is toward the vertical direction.

In the prior art, in a battery cell 11 of a battery module 1, a direction in which an electrode assembly 111 exerts the maximum expansion force on a battery housing 112 is toward a horizontal direction. Since the size of the battery module 1 in a horizontal direction is much larger than the size thereof in a vertical direction (for example, due to limitation of the height of a vehicle chassis, more battery cells 11 are required to be arranged in the horizontal direction, and the accumulated expansion force is large), the existing battery module 1 suffers from an extremely large expansion force in the horizontal direction, and it is necessary to provide very thick end plates on two sides of the battery module 1 in the horizontal direction to resist the expansion force. However, the thicker end plates will reduce energy density of the battery module 1. In this embodiment, a direction in which the electrode assembly 111 exerts the maximum expansion force on the battery housing 112 is toward the vertical direction, and the number of battery cells 11 arranged in the vertical direction is smaller. Therefore, compared with the prior art, the maximum expansion force of the battery module 1 can be significantly reduced.

In addition, as shown in FIG. 7, since the battery cell 11 generates gas inside the battery housing 112 during the charging and discharging process, the generated gas will exert a force on the battery housing 112, thereby increasing the outward expansion of the battery housing 112. Since the area of the first surface 1121 is larger than the area of the second surface 1122, and the two first surfaces 1121 in the battery cell 11 face each other in the vertical direction, a direction of the maximum force exerted by the generated gas on the battery housing 112 is also toward the vertical direction. Compared with the prior art, the maximum expansion force of the battery module 1 is further reduced.

As shown in FIGS. 6, 7, and 10, the insulating member 13 includes a first face 131 and a second face 132, the first face 131 is located on a side face of the battery cell arrangement structure 10, and the second face 132 is located on a bottom face of the battery cell arrangement structure 10. The first face 131 is used to abut against the side face (the second surface 1122) of the battery cell 11, and the second face 132 is used to abut against the bottom face (the first surface 1121) of the battery cell 11. The abutment described herein may be a direct abutment, or an indirect abutment through other parts (for example, through an insulating layer on the surface of the battery cell 11).

Figure 11:
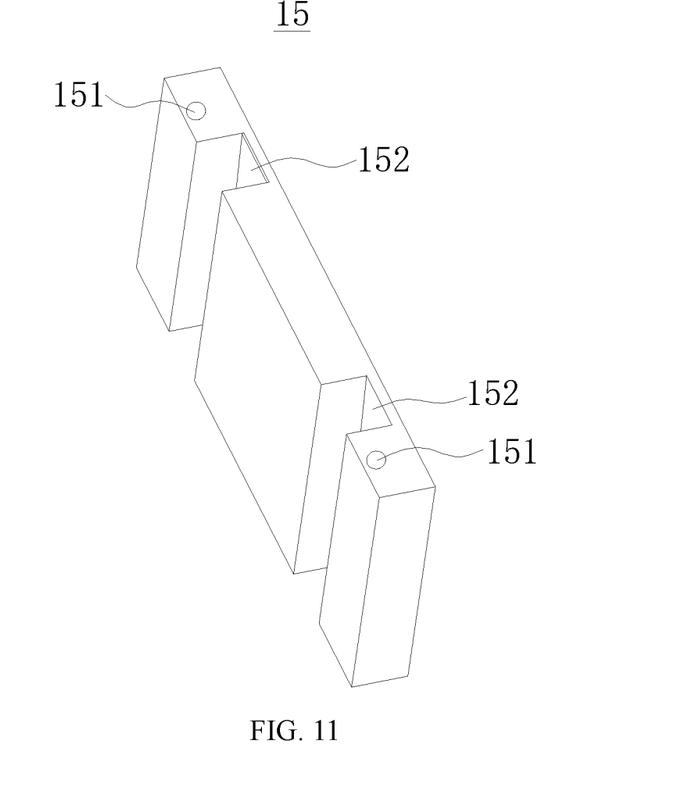
FIG. 11 is a schematic structural diagram of an end plate.

As shown in FIG. 11, the end plate 15 in some embodiments of the present application is provided with a through hole 151 for a bolt 4 to pass through, and the through hole 151 is disposed in a vertical direction. The end plate 15 is also provided with a binding strip restraint groove 152, and the binding strip restraint groove 152 is configured to restrain the binding strip 14. Alternatively, the end plate 15 is provided with a binding strip restraint hole in a vertical direction, which can also restrain the binding strip 14.

During an assembly process, as shown in FIG. 2, a mounting beam 31 is mounted at the bottom of a lower case 3; a plurality of battery cells 11 are arranged in a horizontal direction (for example, a direction indicated by an arrow x) and a vertical direction (a direction indicated by an arrow z); two insulating members 13 are disposed on two sides of the bottom of the plurality of battery cells 11; the plurality of battery cells 11 and the insulating members 13 are fixed through an end plate 15 and a binding strip 14 to form a battery module 1; a bolt 4 passes through a through hole 151 on the end plate 15 to fix the battery module 1 on the mounting beam 31; and a case cover 2 is covered to complete the assembly of a battery pack.

It should be noted that although the foregoing embodiments have been described herein, the protection scope of the present application is not limited thereby. Therefore, based on innovative ideas of the present application, changes and modifications to the embodiments described herein, or equivalent structures or equivalent process transformations made by using the description and drawings of the present application, and direct or indirect application of the above technical solutions to other related technical fields, are all included in the protection scope of the present application.

What is claimed is:

1. A battery module, comprising:
   a plurality of battery cells, the plurality of battery cells being arranged in a horizontal direction;
   two insulating members, each insulating member of the two insulating members comprising a first face and a second face, the first face and the second face are connected and bent relative to each other, the first face being located on a side face of the plurality of battery cells, the second face being located on a bottom face of a battery cell that located on a side of the plurality of battery cells in the horizontal direction, and the two insulating members being respectively disposed on two sides of the plurality of battery cells in the horizontal direction; and a binding strip, the binding strip surrounding the plurality of battery cells and the insulating members;

wherein the battery module further comprises two end plates, the two end plates are respectively disposed at two ends of the plurality of battery cells in the horizontal direction, the end plates are located above the insulating members, and the binding strip surrounds the plurality of battery cells, the two insulating members and the two end plates;

wherein the end plates are provided with a binding strip restraint groove or a binding strip restraint hole;

wherein a battery cell of the plurality of battery cells comprises an electrode assembly and a battery housing, the electrode assembly is accommodated in the battery housing, and the electrode assembly comprises a first electrode sheet, a second electrode sheet, and a diaphragm disposed between the first electrode sheet and the second electrode sheet; and the electrode assembly is in a winding structure and is flat-shaped, an outer surface of the electrode assembly comprises two flat surfaces, and the two flat surfaces face each other in a vertical direction; or, the electrode assembly is in a laminated structure, and the first electrode sheet, the diaphragm, and the second electrode sheet are stacked in the vertical direction.

2. The battery module according to claim 1, wherein the end plates are provided with a through hole for a bolt to pass through, and the through hole is disposed in a vertical direction.

3. The battery module according to claim 1, wherein the binding strip comprises a long side and a short side, the long side extends in the horizontal direction, the short side extends in a vertical direction, and the binding strip surrounds outer peripheries of the plurality of battery cells and the two insulating members.

4. The battery module according to claim 1, wherein the battery cell comprises a plurality of electrode assemblies, and the plurality of electrode assemblies are arranged in a vertical direction.

5. The battery module according to claim 1, wherein the plurality of battery cells are also arranged in a vertical direction.

6. The battery module according to claim 1, wherein the battery module further comprises a plurality of battery cells arranged in a vertical direction.

7. A battery pack, comprising:
a case, the case comprising an upper case cover and a lower case, and the upper case cover being located above the lower case and disposed to be sealed with the lower case; and
a battery module, comprising:
a plurality of battery cells, the plurality of battery cells being arranged in a horizontal direction;
two insulating members, each insulating member of the two insulating members comprising a first face and a second face, the first face and the second face are connected and bent relative to each other, the first face being located on a side face of the plurality of battery cells, the second face being located on a bottom face of a battery cell that located on a side of the plurality of battery cells in the horizontal direction, and the two insulating members being respectively disposed on two sides of the plurality of battery cells in the horizontal direction; and
a binding strip, the binding strip surrounding the plurality of battery cells and the insulating members;
wherein the battery module further comprises two end plates, the two end plates are respectively disposed at two ends of the plurality of battery cells in the horizontal direction, the end plates are located above the insulating members, and the binding strip surrounds the plurality of battery cells, the two insulating members and the two end plates;
wherein the end plates are provided with a binding strip restraint groove or a binding strip restraint hole;
wherein a battery cell of the plurality of battery cells comprises an electrode assembly and a battery housing, the electrode assembly is accommodated in the battery housing, and the electrode assembly comprises a first electrode sheet, a second electrode sheet, and a diaphragm disposed between the first electrode sheet and the second electrode sheet; and
the electrode assembly is in a winding structure and is flat-shaped, an outer surface of the electrode assembly comprises two flat surfaces, and the two flat surfaces face each other in a vertical direction; or, the electrode assembly is in a laminated structure, and the first electrode sheet, the diaphragm, and the second electrode sheet are stacked in the vertical direction.

8. The battery pack according to claim 7, wherein the end plates are provided with a through hole for a bolt to pass through, and the through hole is disposed in a vertical direction.

9. The battery pack according to claim 7, wherein the binding strip comprises a long side and a short side, the long side extends in the horizontal direction, the short side extends in a vertical direction, and the binding strip surrounds outer peripheries of the plurality of battery cells and the two insulating members.

10. The battery pack according to claim 7, wherein the battery cell comprises a plurality of electrode assemblies, and the plurality of electrode assemblies are arranged in a vertical direction.

11. The battery pack according to claim 7, wherein the plurality of battery cells are also arranged in a vertical direction.

12. The battery pack according to claim 7, wherein the battery module further comprises a plurality of battery cells arranged in a vertical direction.

13. The battery pack according to claim 7, wherein a mounting beam is disposed at the bottom of the lower case, and the insulating members are disposed above the mounting beam.

14. A vehicle, comprising:
a battery pack, comprising:
a case, the case comprising an upper case cover and a lower case, and the upper case cover being located above the lower case and disposed to be sealed with the lower case; and
a battery module, comprising:
a plurality of battery cells, the plurality of battery cells being arranged in a horizontal direction;
two insulating members, each insulating member of the two insulating members comprising a first face and a second face, the first face and the second face are connected and bent relative to each other, the first face being located on a side face of the plurality of battery cells, the second face being located on a bottom face of a battery cell that located on a side of the plurality of battery cells in the horizontal direction, and the two insulating members being respectively disposed on two sides of the plurality of battery cells in the horizontal direction; and a binding strip, the binding strip surrounding the plurality of battery cells and the insulating members;

wherein the battery module further comprises two end plates, the two end plates are respectively disposed at two ends of the plurality of battery cells in the horizontal direction, the end plates are located above the insulating members, and the binding strip surrounds the plurality of battery cells, the two insulating members and the two end plates;

wherein the end plates are provided with a binding strip restraint groove or a binding strip restraint hole;

wherein a battery cell of the plurality of battery cells comprises an electrode assembly and a battery housing, the electrode assembly is accommodated in the battery housing, and the electrode assembly comprises a first electrode sheet, a second electrode sheet, and a diaphragm disposed between the first electrode sheet and the second electrode sheet; and the electrode assembly is in a winding structure and is flat-shaped, an outer surface of the electrode assembly comprises two flat surfaces, and the two flat surfaces face each other in a vertical direction; or, the electrode assembly is in a laminated structure, and the first electrode sheet, the diaphragm, and the second electrode sheet are stacked in the vertical direction;

wherein the battery pack is configured to be mounted on the vehicle to provide a power source for the vehicle.

* * * * *